Oct. 12, 1948.    P. A. SPORING ET AL    2,451,125
TUBULAR CONTAINER FOR ELECTRICAL
CONDENSERS OR OTHER APPARATUS
Filed June 27, 1945
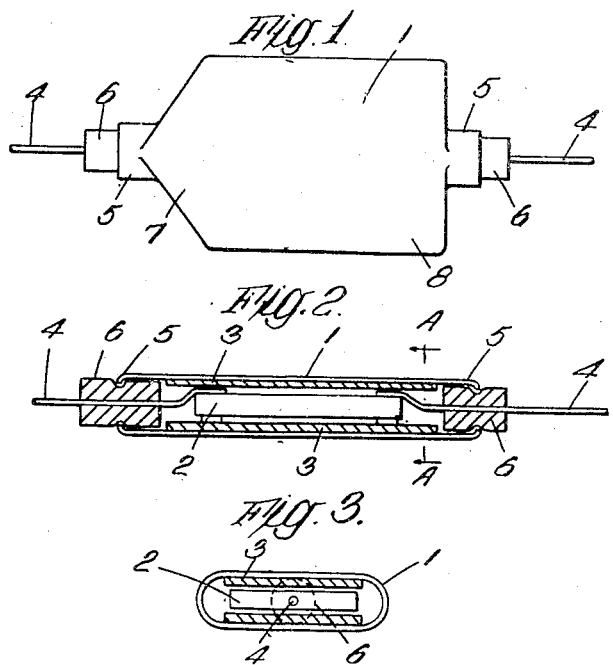
Inventors
Percy A. Sporing
Charles P. Johnson
by Wilfred E. Lawson
Attorney.

Patented Oct. 12, 1948

2,451,125

UNITED STATES PATENT OFFICE 2,451,125

TUBULAR CONTAINER FOR ELECTRICAL CONDENSERS OR OTHER APPARATUS

Percy Archibald Sporing, Hampton Hill, and Charles Piercy Johnson, Hanwell, England, assignors to The Telegraph Condenser Company Limited, North Acton, England, a British company Application June 27, 1945, Serial No. 601,835
In Great Britain May 8, 1944

Section 1, Public Law 690, August 8, 1946
Patent expires May 8, 1964

1 Claim. (Cl. 174—50)

The present invention relates to metal tubular containers for electrical condensers or other apparatus, such containers being designed to form mechanical protection thereto and also to preserve the contents against the effects of moisture or other harmful conditions to which the electrical condenser or other apparatus is subjected. A tubular container to which this invention is applicable is of the type initially open at both ends and, after the condenser or other apparatus has been inserted, it is necessary to close the container so that it shall be hermetically sealed. Difficulty has been found in securing this result, especially in cases in which, as for example, in use in tropical countries, the apparatus is liable to be subjected to variable conditions particularly as regards temperature or humidity. The subject matter shown herein is generally similar to that disclosed in applicants' copending applications 601,829, 601,830 and 601,831 filed concurrently herewith.

Further, some forms of apparatus, for instance, rolled electrical condensers, are conveniently accommodated in tubular containers of circular cross section, while other forms, for example electrical condensers of the stacked type composed of alternate layers of metal foil and dielectric, on account of their shape, do not fit so readily in a cylindrical tube. The present invention has as its main object the provision of a tubular container wherein apparatus of the latter type will fit neatly and which is readily sealed hermetically.

The invention comprises in combination an electrical condenser unit of stacked form, a tubular container of flattened cross section enclosing said condenser unit, sheets of insulation interposed between said condenser unit and said container, the container having a reduced portion at each end, each reduced portion having a circular aperture, a bung of resilient material in each of said apertures, an inturned edge to each of said apertures compressing said inserted bung around the zone intermediate of its length, and a leading out wire extending from said condenser unit through each of said bungs. The resilient material used is most suitably natural rubber or synthetic rubber, such, for instance, as neoprene. As a result of the compression of the bung a satisfactory seal is formed between it and the spun-over edge of the aperture, and seeing that, on account of its resiliency, a waist is formed in the bung, possibility of its being either drawn out of or pushed into the aperture is obviated.

In the case of electrical condensers suitable for mounting in tubular containers, normally there is a leading-out wire at each end and in the present instance such wire would project through a hole in the bung. On account of the resilient nature of the latter and of the gripping action of the spun-over edge of the aperture, an effective seal between each bung and the leading-out wire extending through it is afforded.

The desired flattened or rectangular form of container may be produced in any suitable manner. For example, a length of tube made of flattened or rectangular cross section may be employed, the ends being spun, after insertion of the condenser, etcetera, to a circular form whereof the diameter is equal to or less than the smallest transverse dimension of the tube. The resilient bungs being then located in the circular apertures so formed, normally by reason of their being threaded on leading-out wires, the edge of each aperture is spun over to grip the bung therein. If desired, the formation of the circular aperture at one end may be carried out before insertion of the condenser, etcetera, that at the other end only being performed afterwards.

In order that the invention may be clearly understood and readily carried into effect it will now be described more fully with reference to the accompanying drawings which illustrate, by way of example, the last-mentioned manner of carrying it into effect and wherein—

Figures 1 and 2 are respectively plan and longitudinal sectional views of an electrical condenser of stacked form enclosed within a metal tubular container, and Figure 3 is a section on the line A—A of Figure 2.

Referring to the drawing, the tubular container 1 is of the flattened form illustrated in order readily to accommodate the electrical condenser 2, which is of the stacked type, insulation 3 being interposed between the condenser 2 and the tubular container 1. Leading-out wires 4 extend from the condenser 2 through opposite ends of the container 1, the latter for this purpose being formed with reduced portions or necks 5 for the accommodation of bungs 6 threaded on the leading-out wires 4. The neck 5 at one end of the container 1, for example that seen to the left of Figure 1, together with a reduced portion 7 which forms a shoulder, is constituted before the introduction of the condenser 2 with its leading-out wires 4 and the insulating sheets 3, the opposite end of the container being initially left open and without the formation of a shoulder 8 at that end. After the condenser and its associated elements have been inserted in the container, the shoulder 8 is formed by reducing the open end and forming thereon the neck 5, seen at the right-hand side of Figure 1. The bungs 6 are then inserted in the necks 5 and the edges of the latter are spun over as seen in Figure 2 to grip the bungs, whereby fluid-tight joints are formed between the bungs 6 and the tubular container 1 on the one hand and the leading-out wires 4 on the other hand.

The tubular container 1, as illustrated in Figures 1, 2 and 3, is suitably partially formed from an aluminium pellet by an impacting process: this operation constitutes no part of the present invention and therefore does not require detailed description. The partially formed container is made with the shoulder 7 and neck 5, while at the opposite end it is completely open in order to permit of the insertion of the condenser 2 and its associated elements.

When these have been introduced the open end is reduced to form the shoulder 8 and neck 5 attached thereto.

Finally, the bungs 6 are inserted in the necks 5 and the edges of the latter are spun over to compress and grip the bungs in the manner indicated in Figure 2.

The invention is applicable in connection with all types of condensers, etcetera susceptible of being mounted in a metal tubular container, for example, rolled paper condensers, electrolytic condensers, or ceramic condensers. In the case of electrolytic condensers, the container is preferably made of aluminium in order to ensure an internal surface which is entirely of that metal; in other cases, it may be desirable to employ brass or other metal which may be easily spun and soldered. Even although closure is effected by two bungs through which the leading-out wires respectively extend, it is still possible, if desired, to make electrical connection between one of these wires and the container by using at that end a rubber bung which is conductive, due to the fact that in its manufacture there is incorporated a powder of conductive material.

In the case of electrolytic condensers or other apparatus in which it is desirable to distinguish polarity, the bungs employed for closing the container may be correspondingly coloured or otherwise marked to give effect to the desired distinction.

What we claim and desire to secure by Letters Patent of the United States is:

In combination, an electrical condenser unit of stacked form, a tubular container of flattened cross section enclosing said condenser unit, sheets of insulation interposed between said condenser unit and said container, the container having a reduced portion at each end, each reduced portion having a circular aperture, a bung of resilient material in each of said apertures, an inturned edge to each of said apertures compressing said inserted bung around the zone intermediate of its length, and a leading-out wire extending from said condenser unit through each of said bungs.

PERCY ARCHIBALD SPORING.
CHARLES PIERCY JOHNSON.

REFERENCES CITED

The following references are of record in the file of this patent:

UNITED STATES PATENTS

| Number | Name | Date |
| --- | --- | --- |
| 993,117 | Slick | May 23, 1911 |
| 2,091,839 | Tangeman | Aug. 31, 1937 |
| 2,172,044 | Bowers | Sept. 5, 1939 |
| 2,249,091 | Robinson et al. | July 15, 1941 |
| 2,321,727 | Bardsley | June 15, 1943 |

FOREIGN PATENTS

| Number | Country | Date |
| --- | --- | --- |
| 186,937 | Switzerland | Dec. 16, 1936 |